Oct. 24, 1933.  J. A. CAMERON  1,931,953
METHOD OF AND MEANS FOR SPLICING
Filed March 20, 1930   13 Sheets-Sheet 1
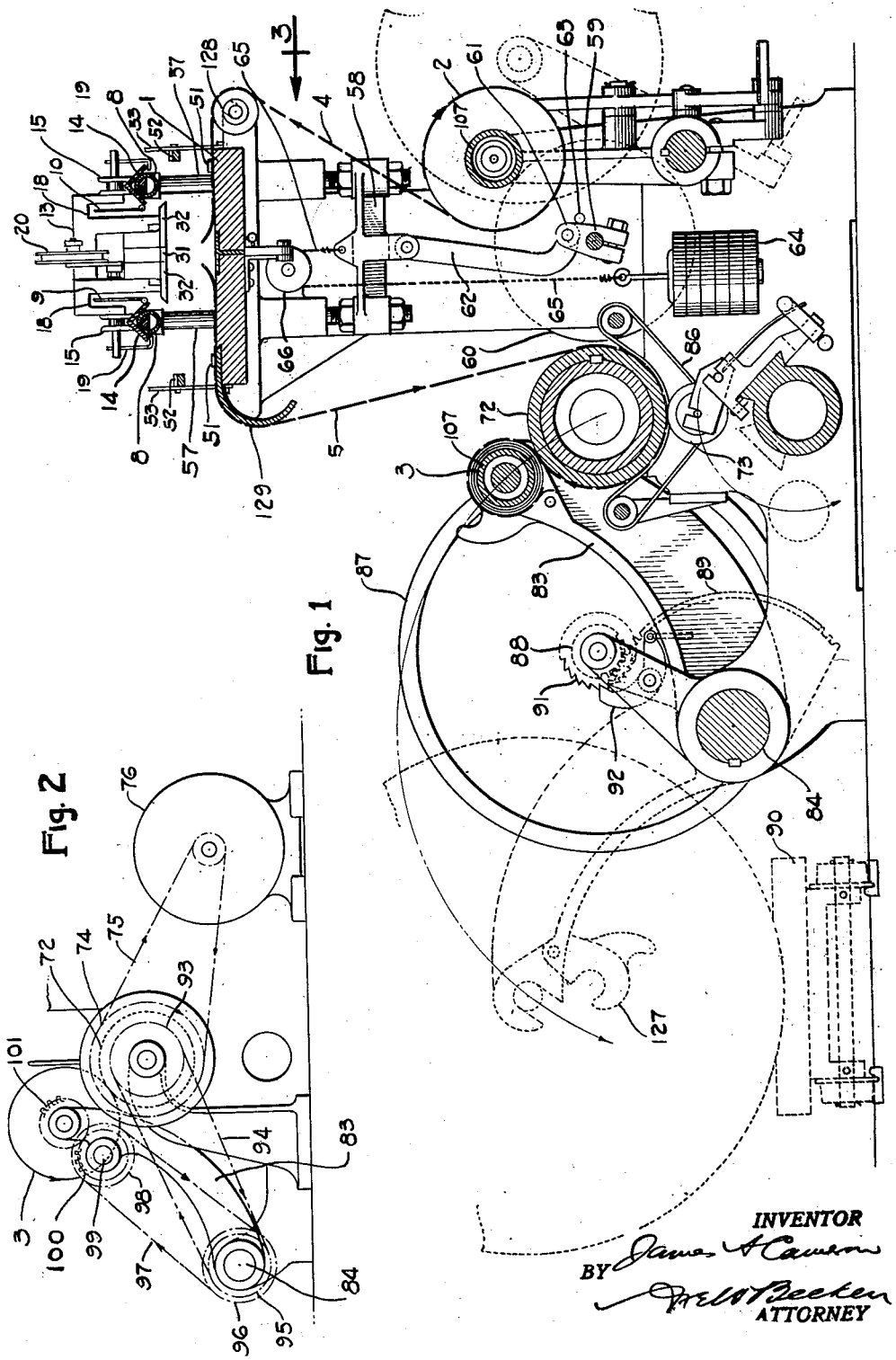

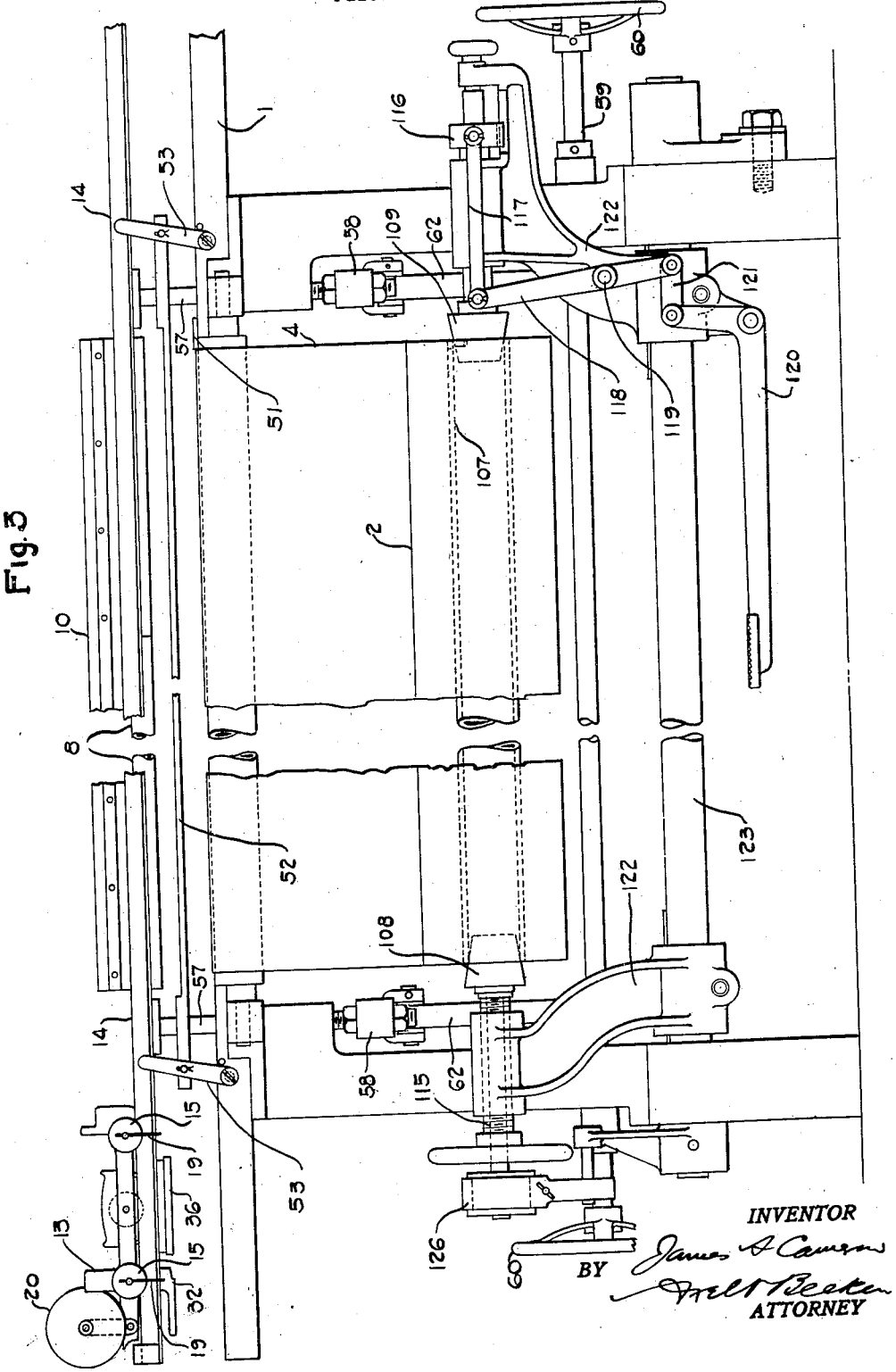

Oct. 24, 1933.  J. A. CAMERON  1,931,953
METHOD OF AND MEANS FOR SPLICING
Filed March 20, 1930   13 Sheets-Sheet 3

INVENTOR
*James A Cameron*
BY
*[signature]*
ATTORNEY

Oct. 24, 1933.     J. A. CAMERON     1,931,953
METHOD OF AND MEANS FOR SPLICING
Filed March 20, 1930    13 Sheets-Sheet 4
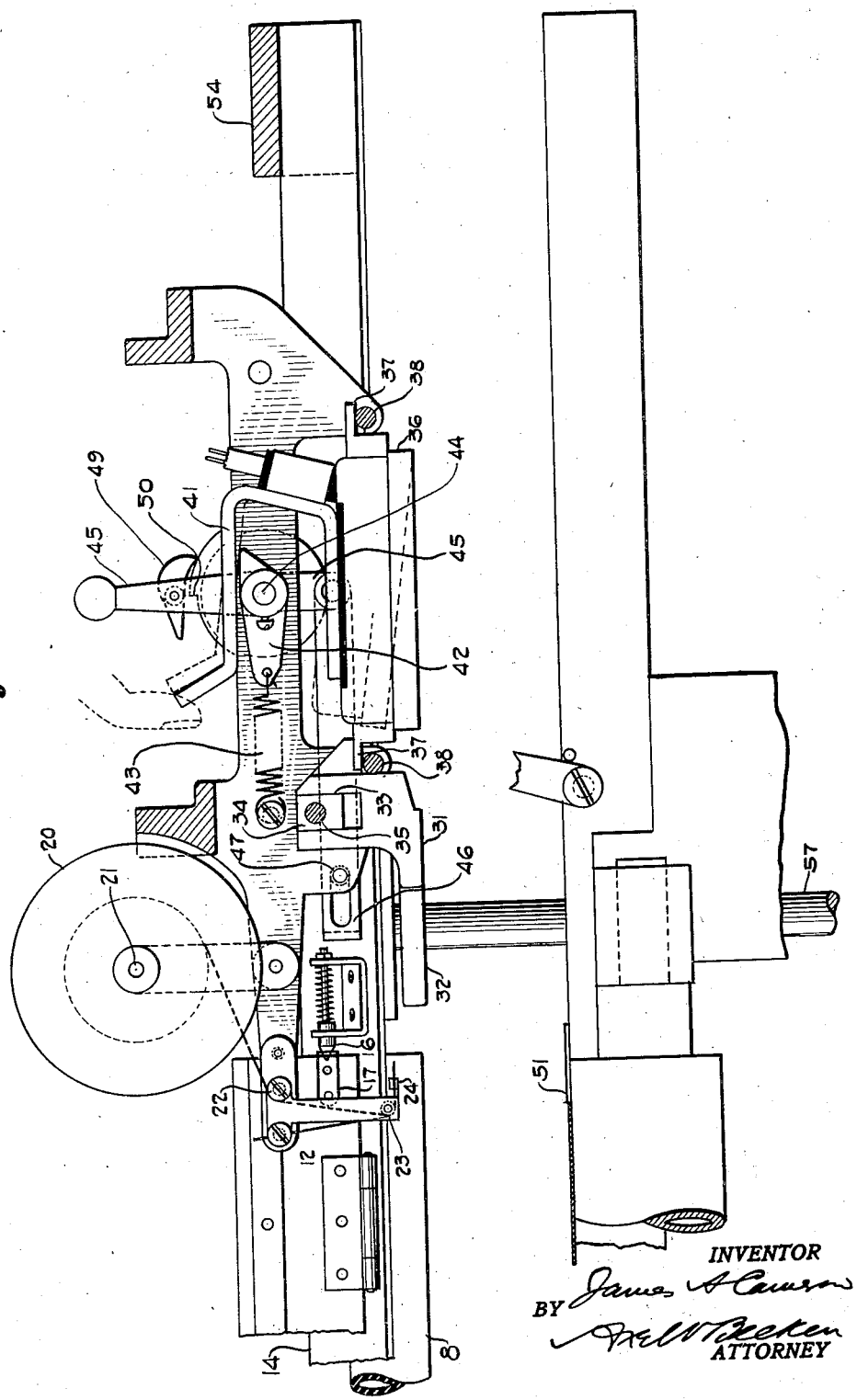
INVENTOR
James A Cameron
BY
ATTORNEY Oct. 24, 1933.    J. A. CAMERON    1,931,953
METHOD OF AND MEANS FOR SPLICING
Filed March 20, 1930    13 Sheets-Sheet 5
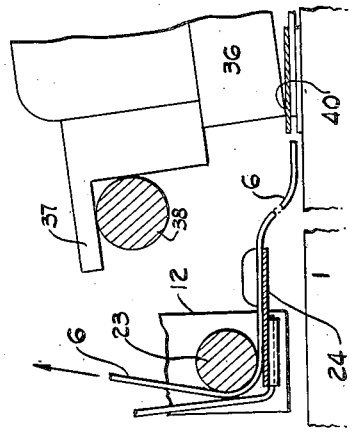
Fig. 8
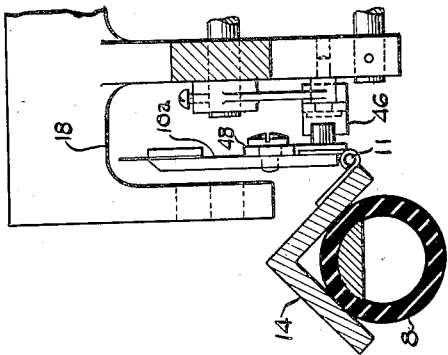
Fig. 9a
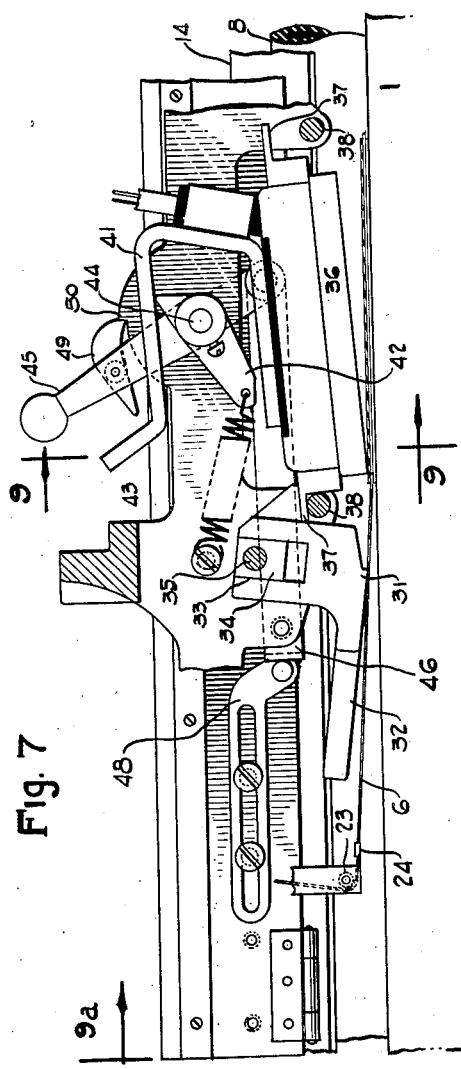
Fig. 7
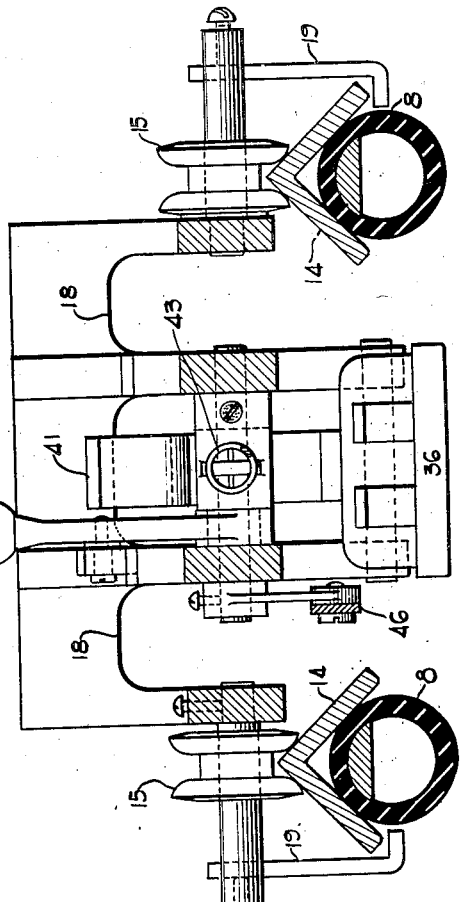
Fig. 9
INVENTOR
ATTORNEY

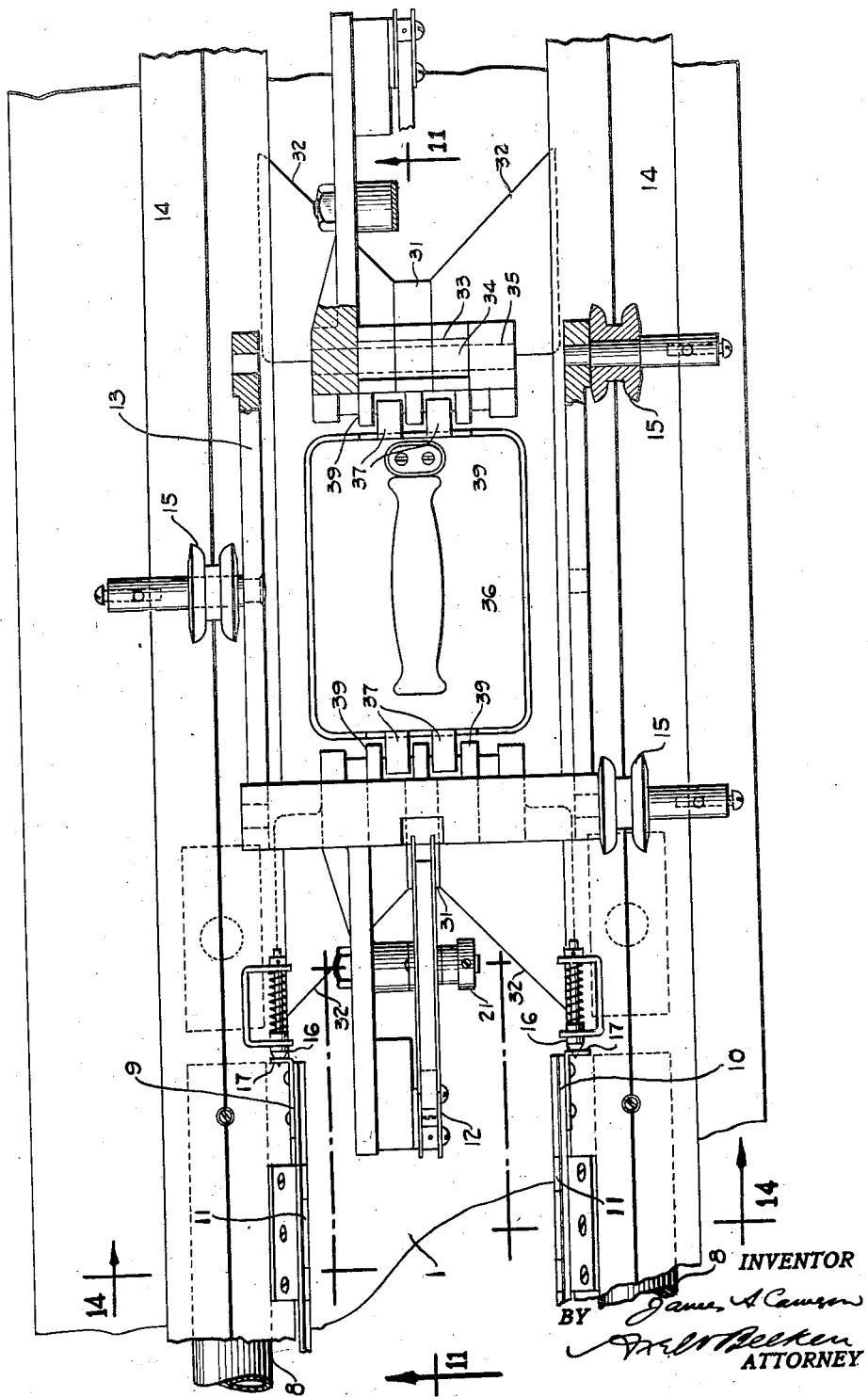

Oct. 24, 1933.    J. A. CAMERON    1,931,953
METHOD OF AND MEANS FOR SPLICING
Filed March 20, 1930    13 Sheets-Sheet 7
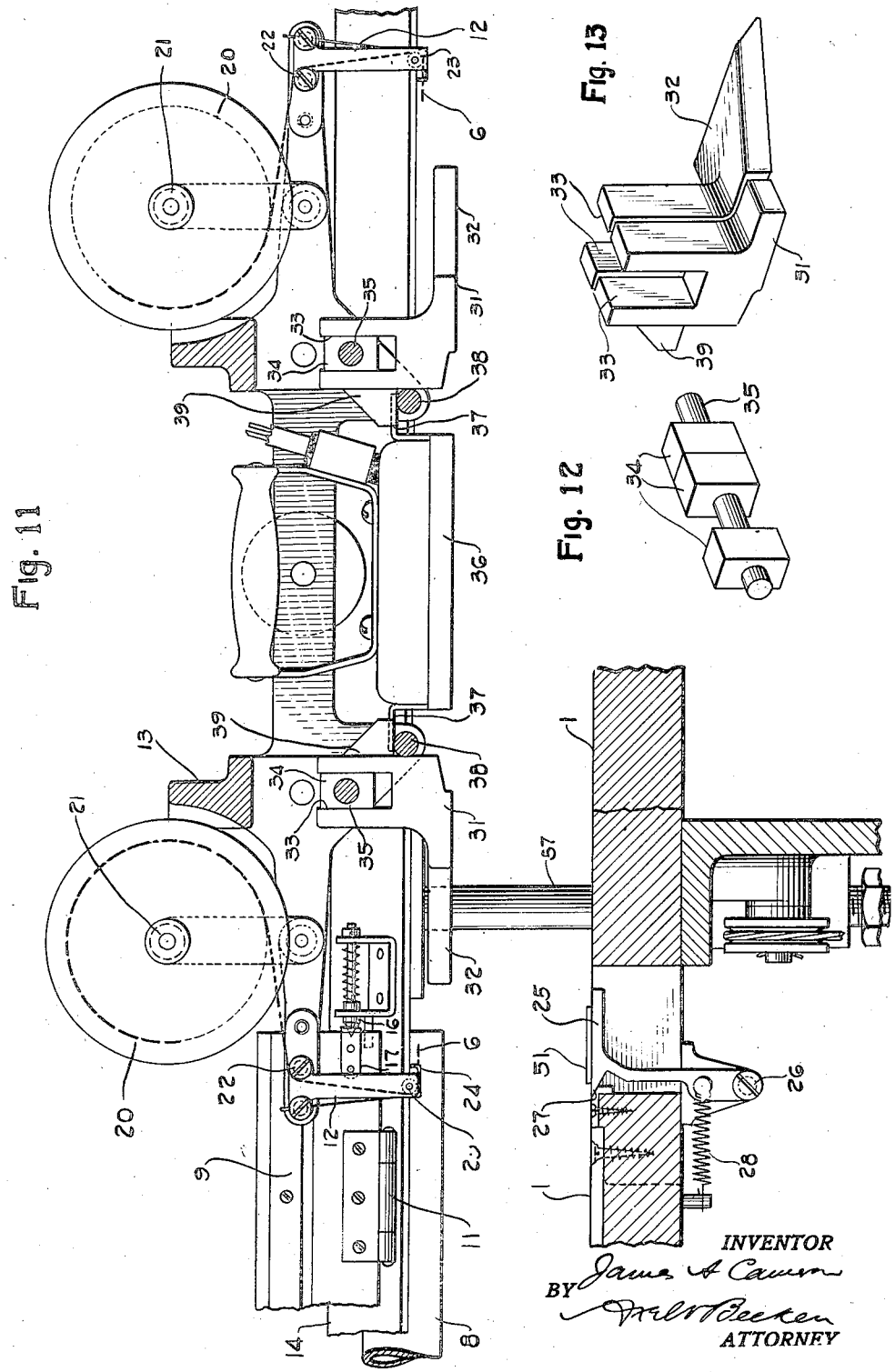

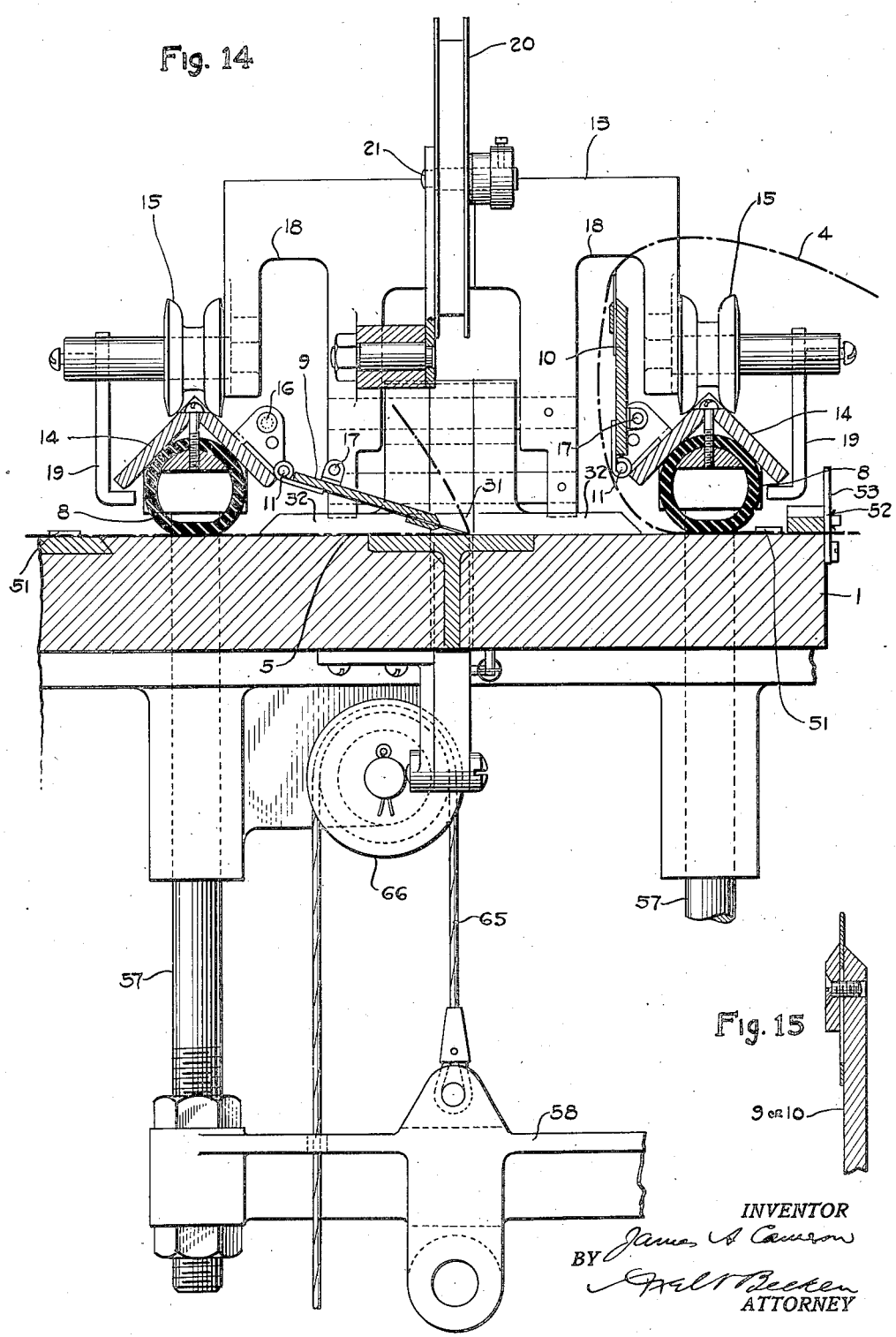

Oct. 24, 1933.  J. A. CAMERON  1,931,953

METHOD OF AND MEANS FOR SPLICING

Filed March 20, 1930  13 Sheets-Sheet 9

INVENTOR
James A. Cameron
BY
ATTORNEY

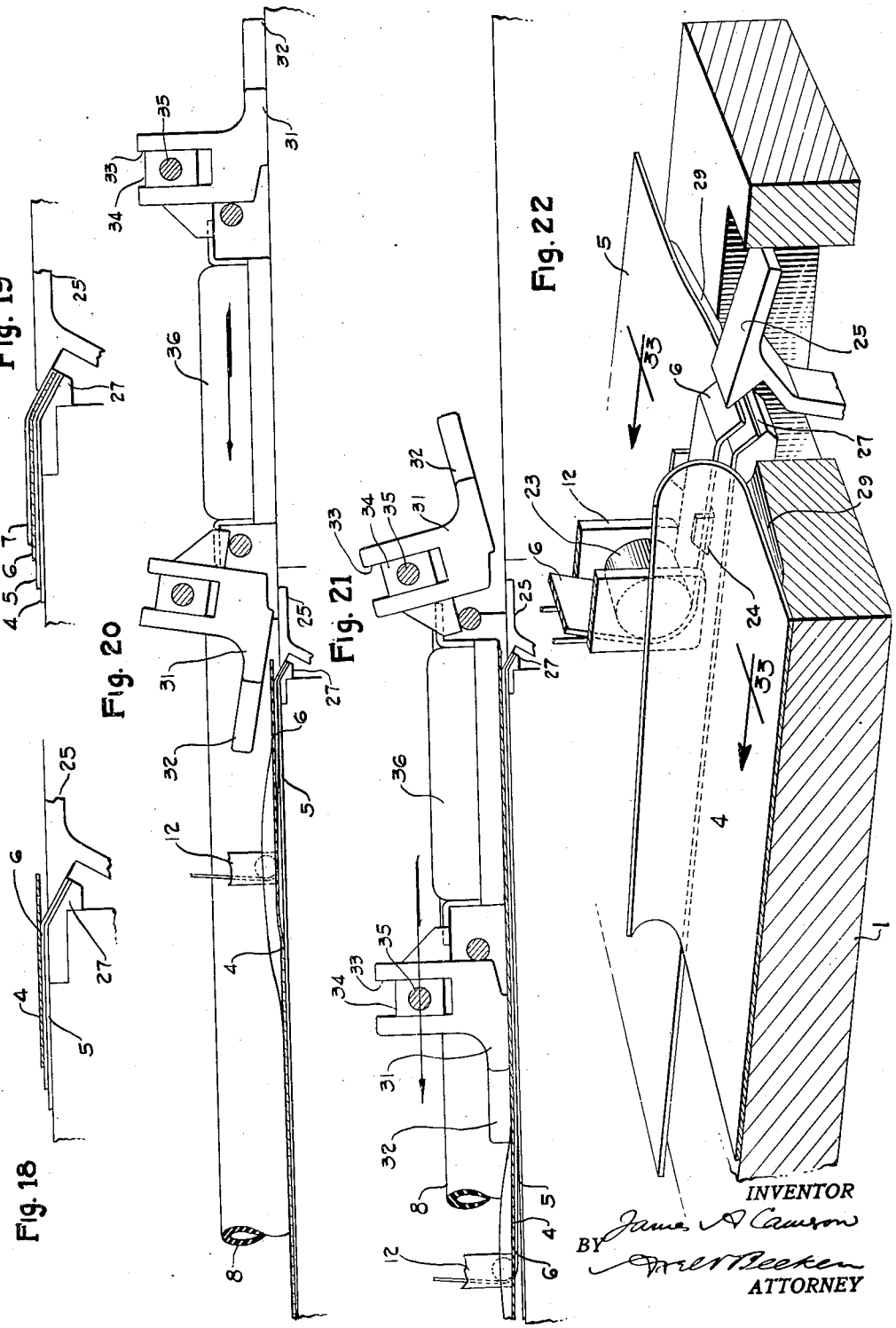

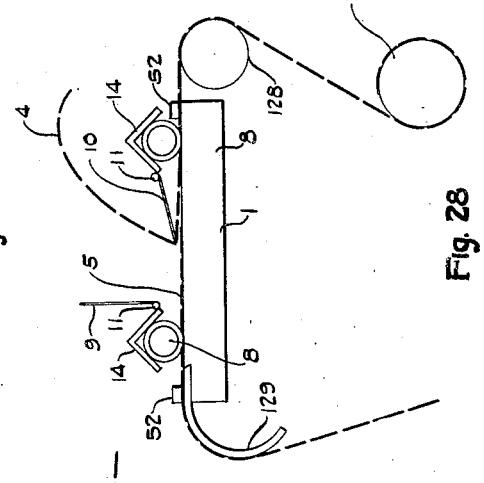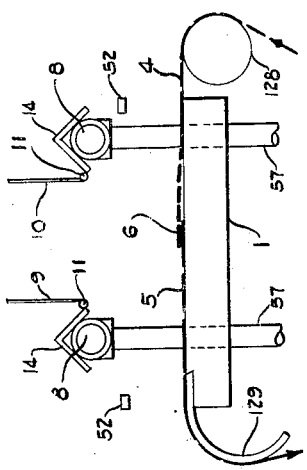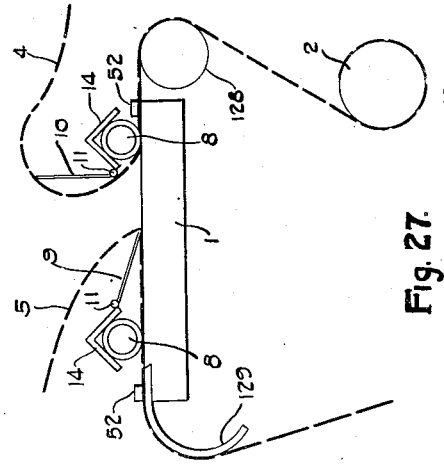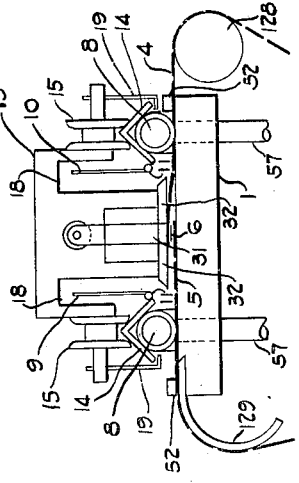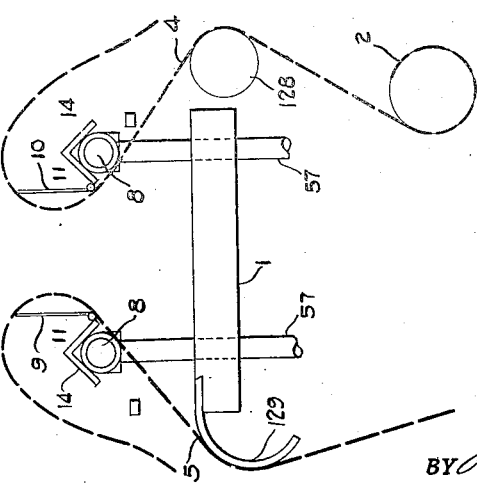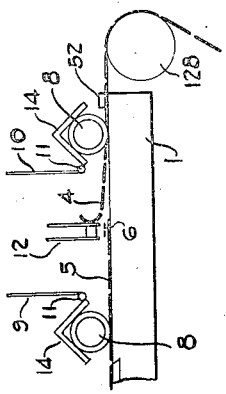

Oct. 24, 1933.  J. A. CAMERON  1,931,953
METHOD OF AND MEANS FOR SPLICING
Filed March 20, 1930    13 Sheets-Sheet 12
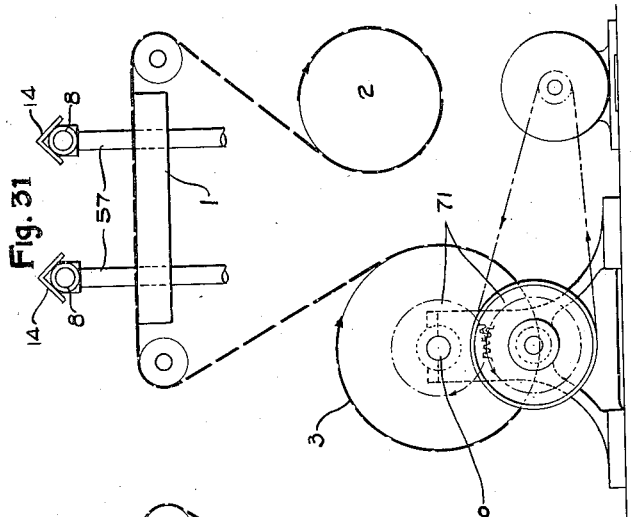
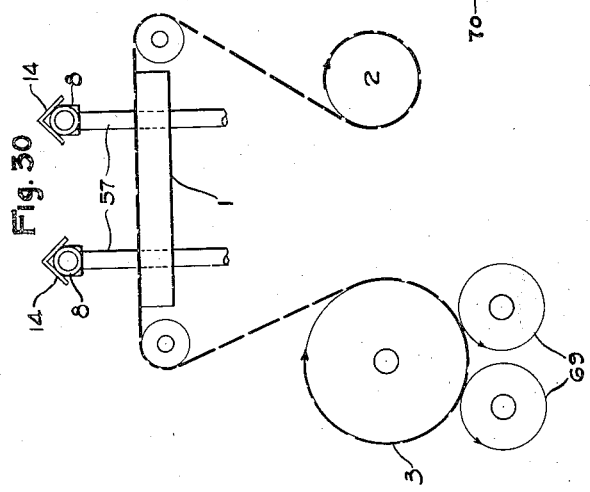
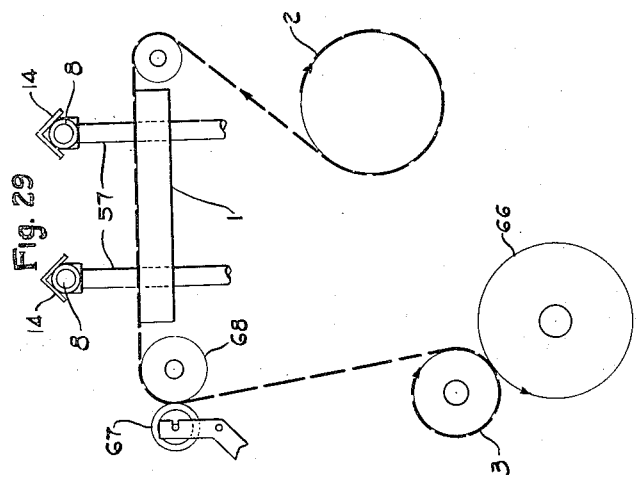
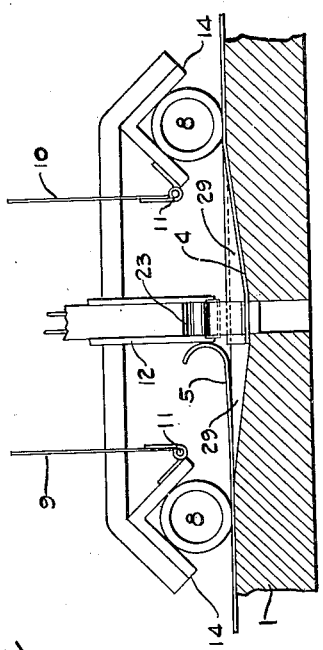
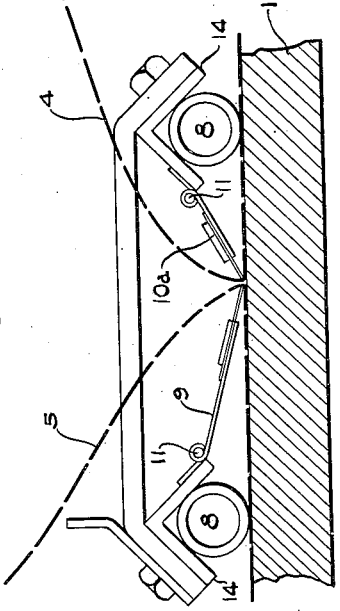
INVENTOR
James A. Cameron
BY
ATTORNEY Oct. 24, 1933.　　　J. A. CAMERON　　　1,931,953

METHOD OF AND MEANS FOR SPLICING

Filed March 20, 1930　　13 Sheets-Sheet 13

INVENTOR
James A. Cameron
BY
ATTORNEY

Patented Oct. 24, 1933

1,931,953

UNITED STATES PATENT OFFICE

1,931,953

METHOD OF AND MEANS FOR SPLICING

James A. Cameron, Brooklyn, N. Y., assignor to Cameron Machine Company, Brooklyn, N. Y., a corporation of New York Application March 20, 1930. Serial No. 437,397

60 Claims. (Cl. 154—42)

The present invention relates generally to methods of and means for splicing sections of flexible material together, and is particularly useful in building up a roll of paper of adequate diameter for commercial purposes from two or more partially exhausted rolls of smaller diameter.

The main object and feature of the invention is to provide means that will admit of the making of splices of several different kinds as may be required by the conditions in different shops and to accomplish this by simple and reliable means. Other objects and features of invention will appear as the specification proceeds. As a matter of fact, the present application comprises a number of inventive features many of which are capable of independent use or of use with instrumentalities and methods widely different from those disclosed herein; but many of these features may nevertheless be combined with advantage into a unitary system or structure as will hereinafter appear.

In the accompanying drawings, the invention is disclosed in several concrete and preferred forms and in which:

Fig. 1 is a transverse, vertical sectional view, somewhat diagrammatic, of a device embodying a preferred form of several features of the invention;

Fig. 2 is a diagrammatic view in elevation of transmission mechanism that may or may not be used in connection with the device of Fig. 1;

Fig. 3 is a view in elevation, partly broken away, of the parts shown in Fig. 1 and looking in the direction of arrow 3 of Fig. 1;

Fig. 6 is a longitudinal vertical sectional view through the splicing carriage, showing one form thereof and with the parts in an inactive position, the carriage being shown in its elevated position;

Fig. 7 is a view similar to Fig. 6 but with some of the parts omitted, with the splicing carriage lowered and with the heating element at the end of its stroke.

Fig. 8 is a somewhat diagrammatic detail view showing more clearly the position of the heating element at the end of the stroke, this view being illustrative not only of the action that occurs in the construction of Figs. 6 and 7, but also of the action that takes place when the construction shown in Figs. 10 and 11 is used;

Fig. 9 is a transverse sectional view substantially on the plane of line 9—9 of Fig. 7;

Figure 5:
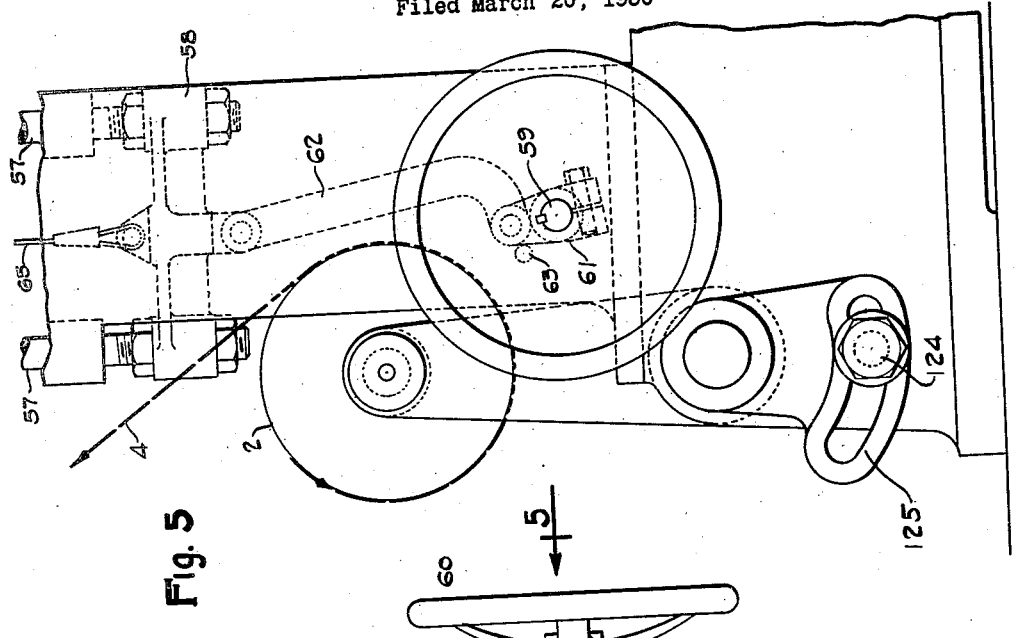
Fig. 5 is a view in elevation looking in the direction of arrow 5 of Fig. 4.
Figure 4:
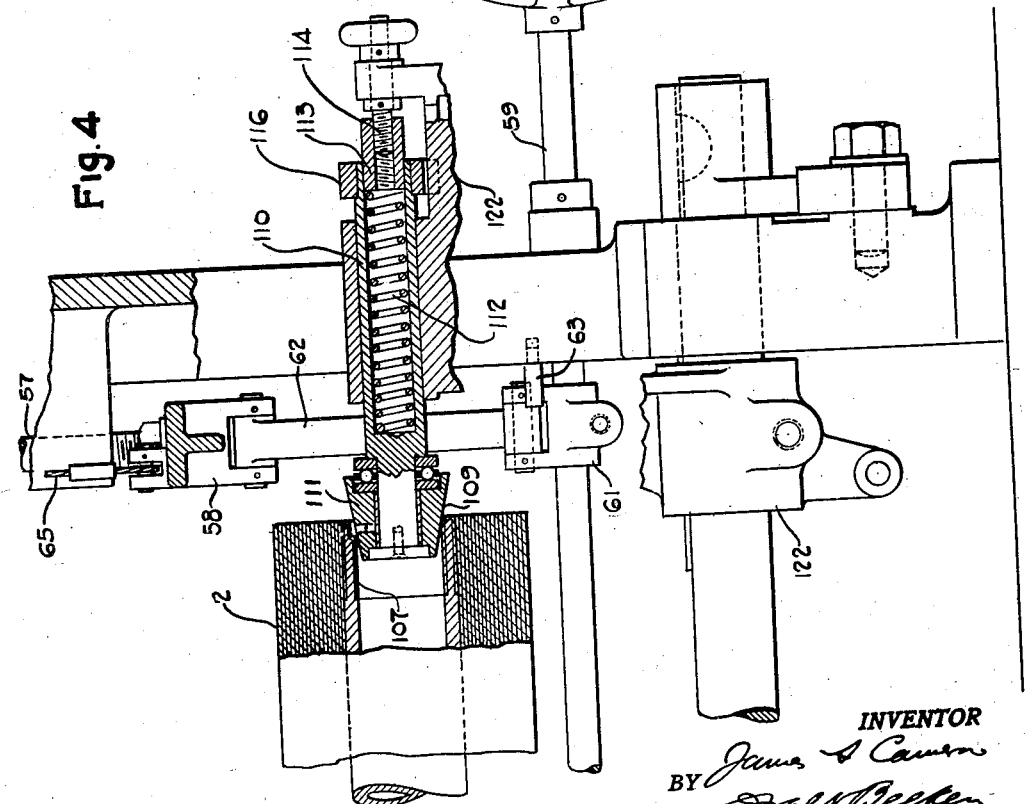
Fig. 4 is an enlarged view of the parts at the right-hand end of Fig. 3, with some of the parts in section.
Figure 16:
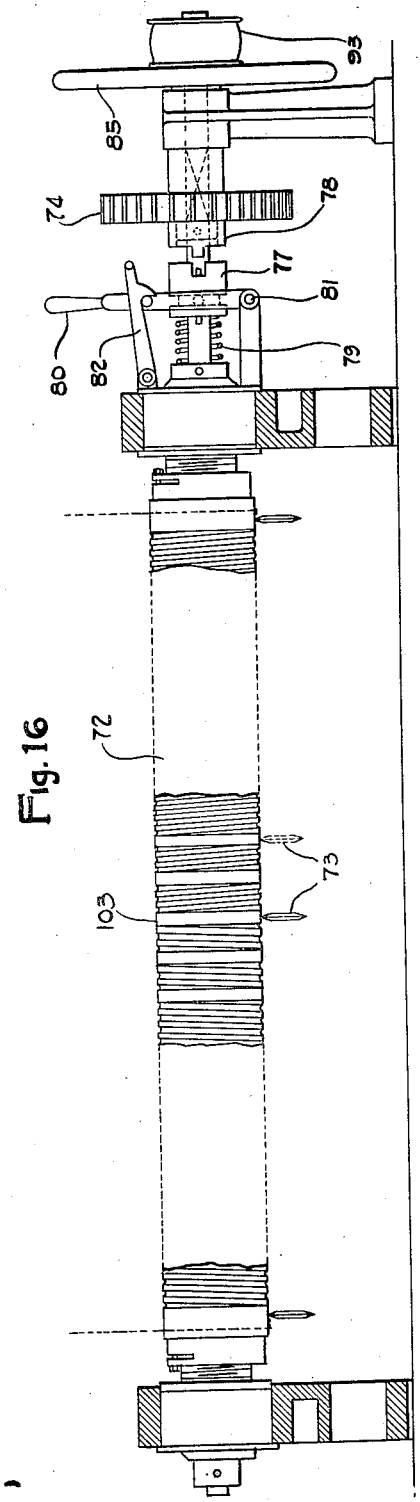
Figure 17:
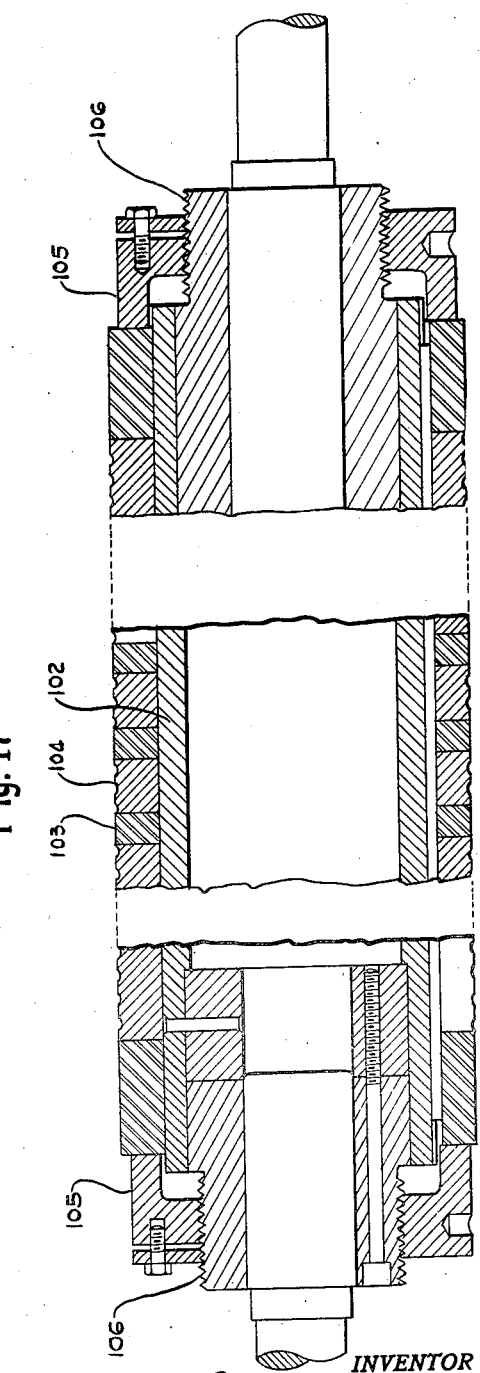
Figure 34:
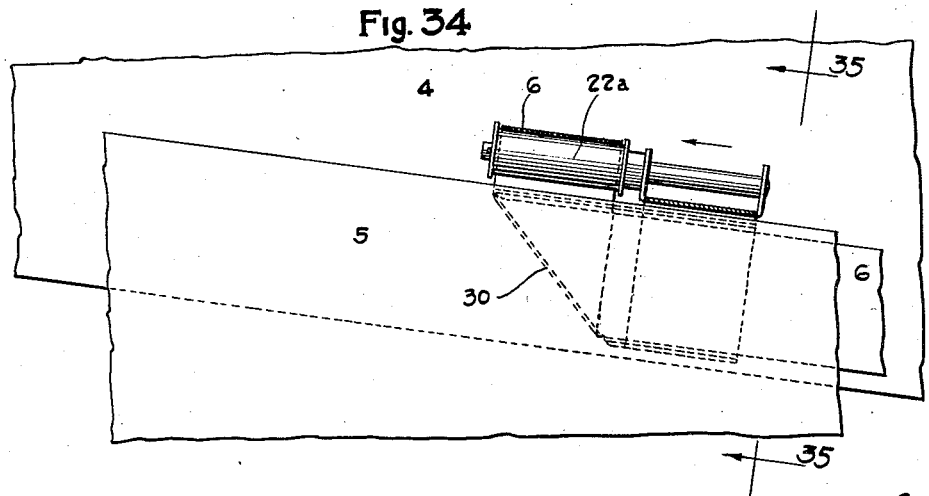
Figure 35:
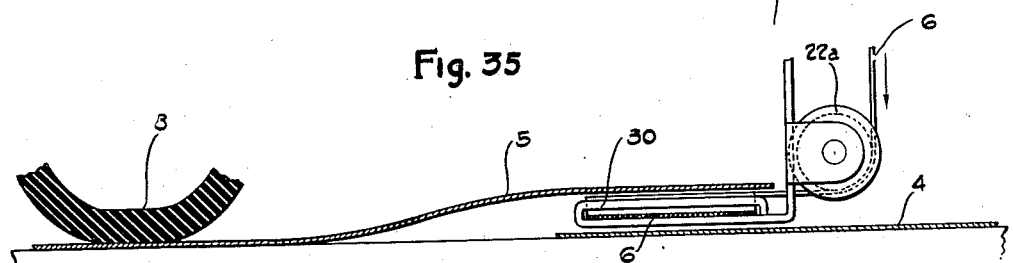
Figure 40:
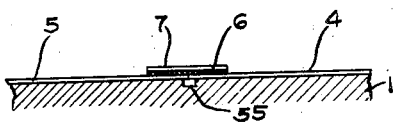
Figure 41:
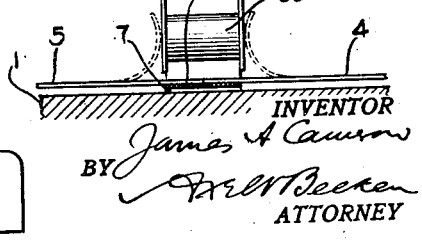
Figure 42:
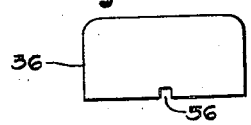

Fig. 9ª is a fragmentary detail sectional view substantially on the plane of line 9ª—9ª of Fig. 7;

Fig. 10 is a top plan view, partly in section, of the form of splicing carriage shown in Fig. 3;

Fig. 11 is a longitudinal vertical sectional view substantially on the plane of line 11—11 of Fig. 10 with the splicing carriage in elevated position;

Fig. 12 is a perspective detail view of the mounting of the smoothing device that may be employed in connection with the invention;

Fig. 13 is a perspective detail view of a preferred form of smoothing device that may be used in connection with the invention;

Fig. 14 is a vertical transverse sectional view substantially on the plane of line 14—14 of Fig. 10, with the splicing carriage in its lowered position;

Fig. 15 is a detailed sectional view of a preferred form of severing member;

Fig. 16 is a somewhat diagrammatic view, partly in section, of a preferred form of surface winding member that cooperates with a winding shaft to wind the spliced material;

Fig. 17 is a fragmentary detail sectional view of the winding member shown in Fig. 16;

Fig. 18 is a diagrammatic view showing one method of clamping an assemblage of flexible material when it is desired to interpose the sealing tape between overlapping ends of web sections;

Fig. 19 is a view similar to Fig. 18 but shows the method employed when a sealing tape is placed above both overlapping ends of web sections;

Fig. 20 is a diagrammatic view of the parts at the beginning of the traverse of the carriage;

Fig. 21 is a view similar to Fig. 20 but showing the carriage at a later point in its traverse;

Fig. 22 is a perspective view of some of the parts illustrated in Fig. 20, the elements being in section and separated for illustrative purposes;

Figs. 23 to 28 inclusive are a series of diagrams illustrating the different steps in one of the preferred methods that can be carried out by means of the device;

Figs. 29 to 31 inclusive are diagrams showing different types of winding means that can be employed in connection with the invention;

Fig. 32 is a view similar to Figs. 24 and 25 and showing the method employed when a butt-splice is to be made;

Fig. 33 is a view similar to Fig. 26 but showing the parts more in detail;

Fig. 34 is a detail plan view, partly in section, of a modified form of tape-feed;

Fig. 35 is a sectional view substantially on the plane of line 35—35 of Fig. 34;

Figs. 36 to 41 inclusive are diagrams showing various forms of splices that may be produced by the methods and devices of the application; and Fig. 42 is a diagrammatic view of a modified form of heating element.

Figure 36:
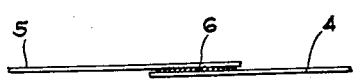
Figure 39:
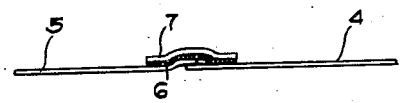
Figure 37:
Figure 38:

The general arrangement of the parts that is preferably to be followed will be understood from Fig. 1, in which 1 indicates a splicing table and 2 and 3 indicate rolls of flexible web material, as paper. Webs 4 and 5 of these rolls are to be spliced on the table after which the material from roll 2 is wound on roll 3. This operation is continued until roll 3 has acquired a diameter requisite for commercial use. The character of the splice may vary greatly. As shown in Fig. 36, webs 4 and 5 may be brought into greatly overlapping relation and a sealing tape 6 may be introduced therebetween; or, as shown in Figs. 37 and 38, the overlapping may be relatively slight and from these two figures it will also be evident that it is immaterial whether web section 5 or web section 4 is the top one. In Fig. 39 the web sections are here also arranged to form an overlapping splice; but the sealing tape, instead of being interposed between the two web sections, is placed in a straddling position over the joint and may have a paper backing 7 in a well-understood manner. In Fig. 40 the web sections are trimmed or gauged to form a butt-splice, that is: the web sections are non-overlapping and sealing tape 6 is in straddled relation thereto and is placed on the upper surface thereof. In Fig. 41 I again have a butt-splice; but here the sealing tape is below the web sections. It will be obvious that in trimming or gauging the web sections preparatory to forming a butt-splice as in Figs. 40 and 41, a rotary severing member may be employed in a manner well-known in the art. It is preferred, however, to employ severing members of a different character because the severing members herein disclosed lend themselves readily to the production of lap-splices as well as butt-splices. That this is so will be readily appreciated from Figs. 23 to 28 inclusive and Fig. 32. As there shown, 8 indicates clamps and 9 and 10 indicate severing members associated with the splicing table. These severing members or blades are arranged at opposite sides of the contemplated splice and extend transversely across the web sections in face-to-face relation. The members are individually movable into and out of gauging and severing position by being pivotally mounted at 11. The web sections are brought under clamps 8 as shown in Fig. 23, after which said clamps are moved down to hold the web sections on the table. One of the severing members, here 9, is then brought down (Fig. 24) thereby constituting a tearing edge along which section 5 is torn thereby providing a properly trimmed or gauged free end on the web section, which free end is left on the table. Severing member 9 is now turned into an upright position on its pivot, and severing member 10 is brought down (Fig. 25). The free end of web section 4 is now torn along the blade 10 after which the latter is raised. In the case under consideration, this produces overlapping sections of web material, properly gauged, on the splicing table. If it is now desired to introduce a sealing tape, as 6, between the overlapping sections, a paper lifting device, as 12, (Fig. 26) is brought into action which device progressively lifts the top section (4) and permits the sealing tape to be introduced. The top section (4) is now replaced and smoothing and heating elements are brought into action. These elements need not be described at this point,—suffice it to say, that they are here carried by splicing carriage 13 (Fig. 27). The various elements are now removed and clamps 8 are lifted (Fig. 28) and the splice is complete. If it is desired to form a butt-splice, then the severing blades may be adjusted as indicated in Fig. 15, or a short blade as 10ª (Fig. 32) may be substituted in place of 10.

Some of the methods of operation now being understood I will proceed to a more detailed description of various mechanisms that may be employed in connection with the invention.

In one of the preferred forms of the invention herein shown, (Figs. 1, 3 and 10 to 14 inclusive) clamps 8 are of resilient material, such as rubber, and have secured thereto rails 14 to receive rollers 15 of splicing carriage 13. As a matter of convenience, severing blades 9 and 10 have their pivots 11 on rails 14, and these blades, when not in use, are elevated, as shown best at the right-hand side of Fig. 14, and are held in this position by a spring detent 16 (Figs. 10 and 14) which enters a socket 17 in a blade. From Fig. 14 it will also be seen that splicing carriage 13 is so cut out at 18 that it clears the blades when the latter are in their elevated position. 19 indicates projections, carried by the pintles of rollers 15, that pass beneath rails 14 so as to prevent upward displacement of the carriage with respect to the rails.

Splicing carriage 13 is capable of a traversing movement over the splicing table by traveling on rails 14 and suitable splice-applying means are mounted on the carriage, said means, in the present instance, taking the following form: 20 indicates a sealing-tape reel, to supply sealing tape 6, rotatably mounted at 21 on the splicing carriage. The sealing tape is led over a guide roll 22 and thence between guide roll 23 and friction plate 24 (Figs. 8, 22 and 23). This friction device is conveniently carried by paper lifting or separating device 12 so that (Fig. 22), as the splicing carriage traverses the table, a web section, as 4, will be lifted and the sealing tape (6) will be deposited on web section 5. In order to accomplish this operation there is provided a clamp 25 (Figs. 11, 18 and 22) in a recess in the splicing table, which clamp is pivotally supported at 26 and is normally urged toward clamping surface 27 by a spring 28. It will be understood that the operator, preparatory to the traverse of the splicing carriage across the table, places paper lifting device 12 substantially in the position indicated in Fig. 22 and introduces lower paper section 5 and the end of sealing tape 6 beneath clamp 25, after which the traverse of said splicing carriage causes paper section 4 to be progressively lifted and sealing-tape reel 20 to rotate in response to the resistance of clamp 25. By these means, the sealing tape is laid for the splicing operation. In case it is desired to obtain the character of splice indicated in Fig. 39, clamp 25 (Fig. 19) is caused to clamp both web sections and sealing tape. So likewise, if it is desired to obtain the splice of Fig. 40, clamp 25 will clamp both web sections and sealing tape; but in this case the web sections would be in the same plane (Fig. 40) and not overlapped as in Fig. 19. If it be desired to obtain the splice of Fig. 41, only the sealing tape would be clamped by 25. In order to keep web sections 4 and 5 from tearing, when subjecting them to the action of clamp 25, it is preferred to provide table 1, adjacent clamp 25, with opposed inclined surfaces as 29 that slope in a direction toward each other. So likewise, to prevent tearing of the paper, when a very wide splice (Fig. 36) is to be made, it may be preferred to use the paper lifting device and tape guide shown in Figs. 34 and 35. As there indicated, instead of lifting the paper abruptly as in Figs. 22, 33 and 41, the paper may be lifted less sharply by having guide roll 22$^a$, around which tape 6 passes, mounted with its axis substantially parallel to the contemplated splice and wholly outside the overlapping web section. In that case the paper lifting device may be in the form of a turner bar 30 which gives the tape a quarter turn and thereby brings it parallel with said contemplated splice. Figs. 34 and 35 also illustrate the fact that the splice may be made diagonally instead of straight transversely in a manner well understood.

Smoothing means are preferably employed to lap the paper smoothly after it has been lifted and the tape has been laid. Such smoothing means here take the form of two shoes 31 and 32 (Figs. 11, 13, 20 and 21). One, 31, follows the trace of tape 6 and the other, 32, follows the trace of the lifted web section. If both web sections are lifted, as in Fig. 41, then there may be two shoes like 32, one in each side of 31. In any event it is preferred to have two shoes like 32 so that either web section may overlap the other one. The shoes have open bearings 33 which fit blocks 34 slidably (Fig. 12), and these blocks are carried on a rockshaft 35 mounted to rock in the framework of the splicing carriage. These shoes will therefore accommodate themselves to an unevenness and can be tilted as shown in Figs. 20 and 21 when passing over clamp 25 or when about to engage the paper.

A suitable heating element to fuse the sealing tape is employed. It is here indicated at 36 and is preferably an electrically heated and thermostatically controlled iron. As shown best in Figs. 10, 11, 20 and 21, this heating element is adjustable back-and-forth, up-and-down and is tiltable in the splicing carriage. Preferably said iron is provided with lugs 37 that rest on rods 38 of the splicing carriage and shoes 31 and 32 likewise have lugs 39 that rest on said rods 38. At the beginning of the fusing operation, the parts occupy substantially the position indicated in Fig. 20 in which it will be seen that the heating element is first moved forward in the carriage (indicated by the arrow) thereby causing lugs 37 to engage the shoes to tilt the same so that they may pass over clamp 25 and on top of the paper. The splicing carriage is now moved (indicated by the arrow in Fig. 21) this causing iron 36 to remain stationary momentarily until it encounters a back stop (which may be another set of shoes). The forward movement of the splicing carriage admits of the (forward) shoes swinging down into engagement with the paper, and, as the carriage proceeds, paper lifting device lifts the paper, the sealing tape is laid and kept straight by shoe 31 while at the same time the paper lifted by 12 is smoothed down by shoe 32. The advance of the carriage also causes the heating element to fuse the sealing tape and web sections together. Preferably the heating element is also slightly tilted at the beginning of the movement of the carriage so as to bring it over clamp 25 and so as to fuse the tape on inclined surface 27 (Fig. 22). When the carriage reaches the end of its movement, the iron is again preferably tilted (Fig. 8) thereby pinching the sealing tape at 40 so as to sever the same. This tilting of the parts can be carried out manually; but, under certain conditions, it is preferred to do it automatically. The means for accomplishing this are illustrated in Figs. 6, 7, 9 and 9$^a$. As there shown, the heating element may be provided with an abutment surface, here a handle 41, and adjacent thereto, and pivotally mounted on the carriage frame, is a tilting dog 42 normally held in the position shown in Fig. 6 by spring 43. It will be seen that, when this dog is moved into the position shown in Fig. 7, it tilts the heating element. Connected to pivot 44 of dog 42 is an arm 45 that carries a slotted link 46 slidable on pin 47 and positioned to engage adjustable stop 48 on one of the blades 9 or 10. When the splicing carriage approaches the end of its movement, said link 46 will encounter stop 48 and this will move lever 45, and consequently dog 42, into the position shown in Fig. 7. This causes the heating element to be tilted which, in turn, tilts shoes 31 and 32 so that the sealing tape will be released. Mounted on lever 45 is a pawl 49 that engages tooth 50 on the framework of the carriage and retains the parts in their tilted position. As indicated in Fig. 6, the heating element can also be tilted manually in the opposite direction from that indicated in Fig. 7 so as to effect a tilting of the parts at the beginning of the traverse of the splicing carriage.

As indicated in Figs. 3, 10, 11, 20 and 21, the splicing carriage can be provided with two sources of sealing tape like 20, with two paper lifting devices like 12, with two sets of smoothing devices, like 31, 32, and with two clamps like 25. With this arrangement, a splicing operation can be effected by a traverse movement of the splicing carriage in either direction across the table.

In addition to the foregoing devices, there may be associated with the splicing table auxiliary gauges and clamps. Thus, 51 indicates side gauges against which web sections 4 and 5 may be placed and 52 indicates preliminary clamps to hold the web sections until clamps 8 are brought into action (Figs. 1, 3 and 14). Clamps 52 are conveniently carried by pivotal arms 53 mounted on the framework. So also, there will be associated suitable stop elements with the various parts; 54 in Fig. 6, for instance, indicates a stop mounted on the carriage rail to limit the movement of the splicing carriage. It is also to be observed that, when a splice of the type shown in Fig. 40 is made, a groove 55 is arranged in the splicing table to receive any surplus gum from the sealing tape when the latter is fused. Conversely, when the splice of Fig. 41 is made, heating element 36 may have a groove 56 (Fig. 42) for the same purpose as groove 55.

One of the independent features of the device resides in the means for lifting and lowering the splicing carriage with respect to the splicing table. As previously described, the splicing carriage is supported on rails 14 which latter, in turn, are carried by clamps 8. Means are, therefore, provided for raising and lowering said rails and clamps, and said means are here so arranged that the combined track and clamp are retained, at all times, in a substantially level position. The advantage of this is that, not only is the splicing carriage thereby prevented from traverse movement during the lifting and lowering thereof, but clamps 8 are thereby also caused to clamp the paper sections substantially simultaneously at all points and with substantially equal pressure thus preventing wrinkling or displacement of said web sections. As here shown, 57 indicate vertically slidable members in the form of four posts, two at each side, arranged in the framework of the splicing table (Figs. 1, 3, 5 and 14). The posts at each side are connected by yokes 58. 59 indicates a rotatable shaft to be operated by handwheels 60 and carrying crank 61. Interposed between and pivotally connected to said cranks and yokes are arms 62, and it will be seen that these elements constitute, in effect, toggles which hold the combined rails and clamps in the upper and lower position as the case may be. 63 is a stop to prevent movement of the toggles beyond the dead center when said rails and clamps are in the upper position. If desired, counterweighting means 64 may be employed, said means being carried by flexible connections 65 passing over rollers 66 and attached to the upper side of the yokes.

The winding means for roll 3 (Fig. 1) may, of course, vary widely. In Fig. 29 roll 3 is engaged by a surface winding drum 66 and a slitting element 67 may be associated with roll 68 to slit or trim the paper, if desired. In Fig. 30, roll 3 is supported by two surface winding drums 69. In Fig. 31, roll 3 is mounted on a shaft 70, or on chucks, that are driven by gearing 71, that is: there is here employed a center-drive winding means. Preferably, however, the winding means are constructed as shown in Figs. 1, 2, 16 and 17. 72 indicates a surface winding drum which also constitutes, in this instance, a platen roll for score-cutters 73. Loosely mounted on this winding drum is a transmission element 74 that is driven by a chain 75 from motor 76. 77 is a clutch element, fast on the shaft of drum 72, normally urged into engagement with clutch member 78 of 74 by spring 79. 80 indicates a lever, pivoted at 81, to retract clutch member 77 against the compulsion of the spring, and 82 is a latch to hold the parts in retracted position. Roll 3 is mounted in rock arms 83, carried by rock-shaft 84, and rests against drum 72 and is driven thereby. It will now be understood that, when a splice is to be made, drum 72 may be disengaged from its driving connections and may be rotated reversely by turning fly-wheel 85, fast on the shaft of drum 72. By these means the web may be led back from roll 3 between drum 72 and tapes 86 and up to the splicing table. Slitting elements 73 are disengageable from drum 72 in a well-known manner. When winding is to be commenced, clutch member 77 is thrown in again thereby imparting motion to drum 72 and roll 3. As the diameter of roll 3 increases, arms 83 turn on center 84, and, finally, when roll 3 has attained sufficient size, the winding operation is stopped and shaft 84 is turned, by manipulation of handwheel 87, through pinion 88 and gear sector 89, the latter on shaft 84, to eject the roll of wound material as by placing it on truck 90. If desired, a ratchet 91 and pawl 92 may be employed to prevent backward movement of shaft 84. Under certain conditions, it may be desired to use a combination center and surface rewind machine. In these circumstances, a pulley 93 may drive, by means of belt 94, a pulley 95 loose on shaft 84, and connected to pulley 95 may be another pulley 96 that, by means of belt 97, drives pulley 98 on stub shaft 99 carried by one of the arms 83. Shaft 99 carries a gear 100 that meshes with gear 101 on the shaft or support of roll 3. It will be seen that, by the transmission elements just described, a slip-friction drive for roll 3 is employed which assists drum 72 in driving said roll 3, especially when the material has accumulated to a considerable extent.

Drum 72, which is here also a platen roll, may be composed of a support 102 and a plurality of rings 103 and 104. Of these, rings 103 are of glass-hard material to resist the cutting action of score-cutters 73. Rings 104 may be of softer material and may be provided with the "Johnstone grooves" disclosed in Patent No. 1,355,106. Rings 103 and 104 are splined to support 102 and are preferably held in clamped position by opposed lock nuts or clamping members 105 at the ends of the drum, said lock nuts being in threaded engagement at 106 with support 102.

The rolls of web material, as 2 and 3, are usually mounted on hollow cores, and it is important to provide means whereby a roll, as 2, may be quickly inserted into or removed from the machine. In order to accomplish this, the following expedient may be employed. Referring to Figs. 1, 3, 4 and 5, it will be seen that roll 2 has a hollow core 107 into which fit chuck 108 constituting an abutment member and chuck 109 which is a yielding member. Chuck 109 has a hollow member 110 slidingly mounted in another member and carries at its end a chuck head 111 rotatably mounted on said hollow member. 112 is a spring within the hollow member that normally urges the chuck head into engagement with the roll, and the latter toward abutment chuck 108. Extending into the hollow member is a relatively stationary member 113, adjustable by means of threaded stem 114. Abutment chuck 108 is adjustable by means of stem 115. Suitable means are provided to retract hollow stem 110 against the compulsion of spring 112, and consisting here of a collar 116 attached to 110, said collar being connected by link 117 to lever 118 pivoted at 119, on the framework, and attached to foot pedal bell crank 120 by link 121. It will be seen that, by actuating the foot pedal, member 110 is retracted and chuck head 111 is withdrawn from core 107 so that roll 2 may be quickly removed. It will further be understood that the roll and web may be adjusted sidewise, or lengthwise of the axis of the roll, by turning 115, chuck 109 automatically following the movement of 108. The supporting means for the chucks may be sustained in carrier arms 122 splined to rock-shaft 123, and it will be seen that, by adjusting arms 122 on said rockshaft, the chucks may be located to suit different widths of webs or lengths of rolls. Also rock-shaft 123 can be adjusted on its axis to swing the carrier arms to accommodate different diameters of rolls; and, when so adjusted, can be clamped in position by means of bolt 124 cooperating with curved slot 125. 126 indicates a brake that may be associated with chuck 108.

Roll 3 may be supported in a manner identical with that just described in connection with roll 2, or, as indicated in Fig. 1, if the material is wound on a spindle, a releasable bearing 127 may be employed.

The operation will be clear from the preceding description, and needs only to be summarized briefly. Rolls 2 and 3 are placed in their supporting means or chucks and webs 4 and 5 are led over guides such as roll 128 or plate 129 to the splicing table and are held temporarily by clamps 52, clamps 8, rails 14 and the splicing carriage being in the elevated position. Clamps 8, rails 14 and the splicing carriage are now lowered thereby clamping said webs, after which clamps 52 can be released. The web sections are now severed by means of blades 9 and 10 after which the sealing tape is clamped by 25 and the splicing carriage is caused to traverse the table to produce any of the splices previously described. The splice now being completed, clamps 8 and the devices carried thereby are raised. The web from roll 2 is now wound on roll 3 and, when 2 is exhausted, the winding operation is stopped, the empty core of 2 is removed, and another roll, like 2, is substituted. Another splice is now made and the winding resumed. This continues until sufficient material has been accumulated on 3, when 3 may be ejected and placed on truck 90.

I claim:

1. The method of splicing two web sections which consists in: severing a first section transversely, while holding it clamped in a fixed position, to provide a trimmed free end on said first section, placing a second section in overlapped relation with respect to the trimmed free end of the first one, severing said second section transversely, while holding it clamped in a fixed position, to provide a trimmed free end on said second section, and then uniting the free ends of the two web sections while retaining said web sections clamped in a fixed position.

2. The method of splicing two web sections which consists in: severing a first section transversely, while holding it clamped in a fixed position, to provide a trimmed free end on said first section, placing a second section in overlapped relation with respect to the trimmed free end of the first one, severing said second section transversely, while holding it clamped in a fixed position, to provide a trimmed free end on said second section in overlapping relation with that of the first section, and then uniting the free ends of the two web sections while retaining said web sections in a fixed position.

3. The method of splicing two web sections which consists in: severing a first section transversely, while holding it clamped in a fixed position, to provide a trimmed free end on said first section, placing a second section in overlapped relation with respect to the trimmed free end of the first one, severing said second section transversely, while holding it clamped in a fixed position, to provide a trimmed free end on said second section, in overlapping relation with that of the first section, then lifting the overlapping end of the top section, then depositing a sealing tape on the end of the bottom section, then replacing the end of the top section in overlapping relation, and then applying heat to the assemblage along the line of the sealing tape, all while retaining the web sections in a fixed position.

4. The method of joining sections of flexible material which consists in clamping two web sections in fixed position, then overlapping the adjacent ends of the two sections, then lifting the overlapping end of the top section, then depositing a sealing tape on the end of the bottom section, then replacing the end of the top section in overlapping relation, and then applying heat to the assemblage along the line of the sealing tape.

5. In a splicing device, a splicing table, a carriage movable in opposite directions over said table, and splice-applying means effective to form a splice between two sections of flexible material supported on the table upon movement of said carriage over said table in either direction.

6. In a splicing machine, a splicing table, a splicing carriage to traverse said table, and means on the carriage including: a tape-supply device, a heating element, and a smoothing device composed of two shoes, one in the plane of the tape and the other at one side thereof to engage material on the table.

7. In a splicing machine, a splicing table, a splicing carriage to traverse said table, and means on the carriage including: a paper-lifting device, a tape-supply device, and a heating element.

8. In a splicing machine, a splicing table, a splicing carriage to traverse said table, and means on the carriage including: a paper-lifting device, a smoothing device, a tape-supply device, and a heating element.

9. In a splicing machine, a splicing table, a clamp associated with said table to hold the end of a sealing tape, a splicing carriage to traverse said table, and a tape-supply device on the carriage rotatable in response to the resistance of the clamp as said carriage moves away from the clamp to thereby feed said sealing tape.

10. In a splicing machine, a splicing table, a clamp associated with said table to hold the end of a sealing tape, a splicing carriage to traverse said table, a tape-supply device on the carriage rotatable in response to the resistance of the clamp as said carriage moves away from the clamp to thereby feed said sealing tape, and a friction device also on the carriage through which the tape is threaded tending to resist the feeding movement of the tape.

11. In a splicing machine, a splicing table, a clamp to clamp material on the table and to hold the end of a sealing tape, a splicing carriage to traverse said table, a tape-supply device on the carriage, and a heating element also on the carriage and adapted to pass over the clamp.

12. In a splicing machine, a splicing table, a clamp to clamp material on the table and to hold the end of a sealing tape, a splicing carriage to traverse said table, a tape-supply device on the carriage, and a smoothing device and a heating element also on the carriage and adapted to pass over the clamp.

13. In a splicing machine, a splicing table, a clamp to clamp material on the table and to hold the end of a sealing tape, a splicing carriage to traverse said table, a tape-supply device on the carriage, and a tiltable heating element also on the carriage.

14. In a splicing machine, a splicing table, a clamp to clamp material on the table and to hold the end of a sealing tape, a splicing carriage to traverse said table, a tape-supply device on the carriage, and tiltable smoothing and heating devices also on the carriage.

15. In a splicing device, a splicing table, a combined paper clamp and carriage track above said table, a splicing carriage to travel over said track, and means to raise and lower said combined clamp and track while retaining it substantially level to thereby clamp the paper with substantially equal pressure at all points and to avoid movement of the carriage over the track during the up-and-down movement of said combined clamp and track.

16. In a splicing device, a splicing table, a combined paper clamp and carriage track above said table, a splicing carriage to travel over said track, and means to raise and lower said combined clamp and track while retaining it substantially level to thereby clamp the paper with substantially equal pressure at all points and to avoid movement of the carriage over the track during the up-and-down movement of said combined clamp and track, including vertically slidable members, and toggles to move said members.

17. In a splicing device, a splicing table, a combined paper clamp and carriage track above said table, a splicing carriage to travel over said track, and means to raise and lower said combined clamp and track while retaining it substantially level to thereby clamp the paper with substantially equal pressure at all points and to avoid movement of the carriage over the track during the up-and-down movement of said combined clamp and track, including vertically slidable members, and a rotatable crank and toggles to move said members.

18. In a splicing device, a splicing table, a combined paper clamp and carriage track above said table, a splicing carriage to travel over said track, and means to raise and lower said combined clamp and track while retaining it substantially level to thereby clamp the paper with substantially equal pressure at all points and to avoid movement of the carriage over the track during the up-and-down movement of said combined clamp and track, and counterweighting means associated with said combined clamp and track.

19. In a splicing device, a splicing table, a combined paper clamp and carriage track above said table, a splicing carriage to travel over said track, and means to raise and lower said combined clamp and track while retaining it substantially level to thereby clamp the paper with substantially equal pressure at all points and to avoid movement of the carriage over the track during the up-and-down movement of said combined clamp and track, including vertically slidable members passing below said table, and a rotatable crank and toggles to move said members and arranged below said table.

20. In a splicing device, a splicing table, a combined paper clamp and carriage track above said table, a carriage movable in opposite directions over said track, splice-applying means effective to form a splice between two sections of paper supported on the table upon movement of said carriage over said track in either direction, and means to raise and lower said combined clamp and track while retaining it substantially level to thereby clamp the paper with substantially equal pressure at all points and to avoid movement of the carriage over the track during the up-and-down movement of said combined clamp and track.

21. In a splicing device, a splicing table, a combined paper clamp and carriage track movable toward and away from said table, a carriage movable over said track, splice-applying means mounted on said carriage, and web-severing means mounted on said combined clamp and track independently of the traversing carriage.

22. In a splicing device, a splicing table, a combined paper clamp and carriage track, the latter composed of two rails, movable toward and away from said table, a carriage movable over said track, splice-applying means mounted on said carriage, and a web-severing blade mounted on each rail, said blade when in inactive position admitting of unobstructed traverse of the carriage over the track.

23. In a splicing device, a splicing table, a combined paper clamp and carriage track, the latter composed of two rails, movable toward and away from said table, a carriage movable over said track, splice-applying means mounted on said carriage, and a web-severing blade hinged on each rail, said blade when in inactive position admitting of unobstructed traverse of the carriage over the track.

24. A splicing device including: a splicing table, web-severing means associated with said table, a carriage movable over said table and web-severing means, and splice-applying means mounted on said carriage.

25. A splicing device including: a splicing table, web-severing means associated with said table, a carriage movable over said table and web-severing means, splice-applying means mounted on said carriage, and supporting means, carrying both the web-severing means and the carriage, movable toward and away from the table.

26. A splicing device including: a splicing table, two web-severing blades associated with said table, a carriage movable over said table and web-severing blades, and splice-applying means mounted on said carriage.

27. A splicing device including: a splicing table, two web-severing blades associated with said table, a carriage movable over said table and web-severing blades, splice-applying means mounted on said carriage, and supporting means, carrying both the web-severing blades and the carriage, movable toward and away from the table.

28. A splicing device including: a splicing table, carriage rails above said table, a carriage movable over said rails, web severing blades mounted on the carriage rails independently of the carriage, and splice-applying means mounted on the carriage.

29. A splicing device including: a splicing table, carriage rails above said table, a carriage movable over said rails, web severing blades mounted on the carriage rails independently of the carriage, splice-applying means mounted on the carriage, and supporting means carrying the rails, blades and carriage and movable toward and away from the table.

30. A splicing device including: a splicing table, carriage rails above said table, web-severing blades pivotally mounted on the carriage rails, a carriage movable over said rails, and splice-applying means mounted on the carriage.

31. A splicing device including: a splicing table, carriage rails above said table, web-severing blades pivotally mounted on the carriage rails, a carriage movable over said rails, splice-applying means mounted on the carriage, and supporting means carrying the rails, blades and carriage and movable toward and away from the table.

32. In a splicing machine, a splicing table, a splicing carriage to traverse said table, a heating element tiltably mounted in said carriage, and a trip-device to automatically tilt the heating element after the carriage has traveled a given distance.

33. In a splicing machine, a splicing table, a splicing carriage to traverse said table, a heating element tiltably mounted in said carriage, a trip-device to automatically tilt the heating element after the carriage has traveled a given distance, and a releasable latch to retain the heating element in its tilted position.

34. In a splicing machine, a splicing table, a splicing carriage to traverse said table, a heating element tiltably mounted in said carriage, and a smoothing device, on the carriage in front of the heating element, to be lifted by the tilting of the heating element.

35. In a splicing machine, a splicing table, a splicing carriage to traverse said table, a heating element tiltably mounted in said carriage, a trip-device to automatically tilt the heating element after the carriage has traveled a given distance, and a smoothing device, on the carriage in front of the heating element, to be lifted by the tilting of the heating element.

36. In a splicing machine, a splicing table, a splicing carriage to traverse said table, and a heating element to move with said carriage and capable, independently of said carriage, of an up-and-down, back-and-forth and tilting movement.

37. In a splicing machine, a splicing table, a splicing carriage to traverse said table, a heating element tiltably mounted in said carriage, and a shoe to engage material on the table, mounted on the carriage in front of the heating element, to be lifted by the tilting of the heating element.

38. In a splicing machine, a splicing table, a splicing carriage to traverse said table, a heating element tiltably mounted in said carriage, a trip-device to automatically tilt the heating element after the carriage has traveled a given distance, and a shoe to engage material on the table, mounted on the carriage in front of the heating element, to be lifted by the tilting of the heating element.

39. In a splicing machine, a splicing table, a splicing carriage to traverse said table, a heating element tiltably mounted in said carriage, and a smoothing device, on the carriage in front of the heating element, to be tilted by the tilting of the heating element.

40. In a splicing machine, a splicing table, a splicing carriage to traverse said table, a heating element tiltably mounted in said carriage, a trip-device to automatically tilt the heating element after the carriage has traveled a given distance, and a smoothing device, on the carriage in front of the heating element, to be tilted by the tilting of the heating element.

41. In a splicing machine, a splicing table, a splicing carriage to traverse said table, a heating element tiltably mounted in said carriage, and a shoe to engage material on the table, mounted on the carriage in front of the heating element, to be tilted by the tilting of the heating element.

42. In a splicing machine, a splicing table, a splicing carriage to traverse said table, a heating element tiltably mounted in said carriage, a trip-device to automatically tilt the heating element after the carriage has traveled a given distance, and a shoe to engage material on the table, mounted on the carriage in front of the heating element, to be tilted by the tilting of the heating element.

43. In a splicing machine, a splicing table, a splicing carriage to traverse said table, a heating element movably mounted in said carriage, and a smoothing device, on the carriage in front of the heating element, to be lifted by movement of the heating element in the carriage.

44. In a splicing machine, a splicing table, a splicing carriage to traverse said table, a heating element movably mounted in said carriage, a smoothing device, on the carriage in front of the heating element, to be lifted by movement of the heating element in the carriage, and a trip-device to automatically move the heating element in the carriage after the latter has traveled a given distance.

45. In a splicing machine, a splicing table, a splicing carriage to traverse said table, a heating element movably mounted in said carriage, and a shoe to engage material on the table, mounted on the carriage in front of the heating element, to be lifted by movement of the heating element in the carriage.

46. In a splicing machine, a splicing table, a splicing carriage to traverse said table, a heating element movably mounted in said carriage, a shoe to engage material on the table, mounted on the carriage in front of the heating element, to be lifted by movement of the heating element in the carriage, and a trip-device to automatically move the heating element in the carriage after the latter has traveled a given distance.

47. In a splicing machine, a splicing table, a splicing carriage to traverse said table, a heating element movably mounted in said carriage, and a smoothing device, on the carriage in front of the heating element, to be tilted by movement of the heating element in the carriage.

48. In a splicing machine, a splicing table, a splicing carriage to traverse said table, a heating element movably mounted in said carriage, a smoothing device, on the carriage in front of the heating element, to be tilted by movement of the heating element in the carriage, and a trip-device to automatically move the heating element in the carriage after the latter has traveled a given distance.

49. In a splicing machine, a splicing table, a splicing carriage to traverse said table, a heating element movably mounted in said carriage, and a shoe to engage material on the table, mounted on the carriage in front of the heating element, to be tilted by movement of the heating element in the carriage.

50. In a splicing machine, a splicing table, a splicing carriage to traverse said table, a heating element movably mounted in said carriage, a shoe to engage material on the table, mounted on the carriage in front of the heating element, to be tilted by movement of the heating element in the carriage, and a trip-device to automatically move the heating element in the carriage after the latter has traveled a given distance.

51. In a splicing machine, a splicing table, a splicing carriage to traverse said table, a smoothing device on the carriage, and means controlled by the traverse of the carriage to lift said smoothing device.

52. In a splicing machine, a splicing table, a splicing carriage to traverse said table, a smoothing device on the carriage, and means controlled by the traverse of the carriage to tilt said smoothing device.

53. In a splicing machine, a splicing table, a splicing carriage to traverse said table, a shoe, to engage material on the table, mounted on the carriage, and means controlled by the traverse of the carriage to lift said shoe.

54. In a splicing machine, a splicing table, a splicing carriage to traverse said table, a shoe, to engage material on the table, mounted on the carriage, and means controlled by the traverse of the carriage to tilt said shoe.

55. In a splicing device, a splicing table, a splicing carriage to traverse said table, a tape reel on the carriage, the axis of said tape reel extending at an angle to the direction of movement of the carriage, and a turner bar over which the tape from the reel is led to feed said tape lengthwise in substantially the same direction as that of the movement of the carriage.

56. A splicing machine including: a support for a web roll to be unwound, a rotatable winding device, a splicing table on which webs from said support and winding device are to be joined and over which table web material from the support to the winding device passes during the winding operation, and disconnectible transmission means to drive the winding device to effect winding of the material and also to admit of reverse rotation of said winding device to enable web material from the latter to be placed on the splicing table.

57. In a splicing machine, a splicing table, a traveling paper separating member associated with said table, a sealing tape reel, and guide means to direct the sealing tape to the table through the paper separating member.

58. In a splicing device, a splicing table, means to clamp two web sections to hold them in fixed position on the table, and two web severing members associated with said table, one on each side of the contemplated splice and each movable after the web sections have been clamped into gauging and severing position independently of each other to thereby admit of the production of adjacent web ends correctly gauged for splicing.

59. In a splicing device, a splicing table, means to clamp two web sections to hold them in fixed position on the table, and two web severing blades associated with said table, one on each side of the contemplated splice and each movable after the web sections have been clamped into gauging and severing position independently of each other to thereby admit of the production of adjacent web ends correctly gauged for splicing.

60. In a splicing device, a splicing table, means to clamp two web sections to hold them in fixed position on the table, and two pivotally mounted web severing blades associated with said table, one on each side of the contemplated splice and each movable after the web sections have been clamped into gauging and severing position independently of each other to thereby admit of the production of adjacent web ends correctly gauged for splicing.

JAMES A. CAMERON.